United States Patent
Petrella et al.

(10) Patent No.: US 12,505,635 B2
(45) Date of Patent: Dec. 23, 2025

(54) DETERMINATION AND DISPLAY OF INVERSE KINEMATIC POSES OF VIRTUAL CHARACTERS IN A VIRTUAL ENVIRONMENT

(71) Applicant: Roblox Corporation, San Mateo, CA (US)

(72) Inventors: Vincent Petrella, San Mateo, CA (US); Simone Guggiari, San Mateo, CA (US); David Brown, San Mateo, CA (US); Emiliano Gambaretto, San Francisco, CA (US); Kiran Bhat, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 188 days.

(21) Appl. No.: 18/241,797

(22) Filed: Sep. 1, 2023

(65) Prior Publication Data

US 2025/0061670 A1 Feb. 20, 2025

Related U.S. Application Data

(60) Provisional application No. 63/533,567, filed on Aug. 18, 2023.

(51) Int. Cl.
*G06T 19/20* (2011.01)
*G06T 7/70* (2017.01)
*G06T 13/40* (2011.01)

(52) U.S. Cl.
CPC .............. *G06T 19/20* (2013.01); *G06T 7/70* (2017.01); *G06T 13/40* (2013.01);
(Continued)

(58) Field of Classification Search
CPC ................................ G06T 13/40; G06T 19/20
See application file for complete search history.

(56) References Cited

U.S. PATENT DOCUMENTS

| 2004/0086201 A1* | 5/2004 | Muresan ................. G06T 3/403 |
| | | 382/300 |
| 2009/0132371 A1* | 5/2009 | Strietzel ................. G06Q 30/02 |
| | | 705/14.46 |

(Continued)

FOREIGN PATENT DOCUMENTS

CN 115049764 A * 9/2022 ............. G06T 13/40

OTHER PUBLICATIONS

Holden et al., Learning an Inverse Rig Mapping for Character Animation, SCA '15: Proceedings of the 14th ACM SIGGRAPH / Eurographics Symposium on Computer Animation, Aug. 2015, pp. 165-173 (Year: 2015).*

(Continued)

*Primary Examiner* — Charles Tseng
(74) *Attorney, Agent, or Firm* — IP Spring

(57) ABSTRACT

Implementations described herein relate to methods, systems, and computer-readable media to display a virtual character within a virtual environment on a display device. In some implementations, a method can include obtaining an input pose of the virtual character, wherein the virtual character is based on a rig that comprises a plurality of joints, receiving an indication of one or more of a position and an orientation of a target end effector located on the rig, determining an output pose for the rig wherein the determining comprises calculating a respective orientation and position of one or more joints of the plurality of joints of the rig based on the position of the target end effector and rotation constraints of a plurality of joints of a reference rig, and displaying the virtual character in the output pose on the display device.

20 Claims, 9 Drawing Sheets

(52) U.S. Cl.
CPC ........... *G06T 2207/20044* (2013.01); *G06T 2219/2004* (2013.01); *G06T 2219/2016* (2013.01)

(56) References Cited

U.S. PATENT DOCUMENTS

| | | | | |
|---|---|---|---|---|
| 2020/0320764 | A1* | 10/2020 | Bryson | G06F 9/451 |
| 2022/0076472 | A1* | 3/2022 | Bocquelet | G06T 7/70 |
| 2023/0267668 | A1* | 8/2023 | Starke | G06T 13/40 |
| 2023/0294275 | A1* | 9/2023 | Fang | B25J 9/1671 |
| | | | | 345/474 |

OTHER PUBLICATIONS

English translation of CN 115049764, Sep. 2022 (Year: 2022).*
Aristidou, et al., "FABRIK: a fast, iterative solver for the Inverse Kinematics problem", Graphical Models 73, 2011, pp. 243-260.

* cited by examiner

DETERMINATION AND DISPLAY OF INVERSE KINEMATIC POSES OF VIRTUAL CHARACTERS IN A VIRTUAL ENVIRONMENT

CROSS-REFERENCE TO RELATED APPLICATIONS

This application claims the benefit of priority to U.S. Provisional Application No. 63/533,567, filed Aug. 18, 2023 and titled DETERMINATION AND DISPLAY OF INVERSE KINEMATIC POSES OF VIRTUAL CHARACTERS IN A VIRTUAL ENVIRONMENT, the entire contents of which are hereby incorporated by reference herein.

TECHNICAL FIELD

Implementations relate generally to computer graphics, and more particularly, to methods, systems, and computer readable media to generate poses of virtual characters within a virtual environment.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters and avatars, design, simulate, or create animation routines that are utilized within the environments, decorate avatars, exchange virtual items/objects with other users, communicate with other users using audio or text messaging, and so forth. Users may utilize audio, video, and other digital content to enhance the virtual experience.

During design of animation routines that include virtual characters, users would like to be able to pose virtual characters in an intuitive way, by dragging and positioning end-effectors such as hands, feet and other body parts, instead of having to manually author each joint angle in a rig (skeleton). Inverse Kinematic (IK) solvers can be utilized to enable posing of virtual characters by algorithmically determining a pose that satisfies constraints associated with the rig, in addition to user provided specifications. However, the Inverse Kinematic problem is an under-constrained problem in the general case, and for a given target condition specified by the user there may exist many possible solutions. While some IK solvers enable users to specify joint limits, expressed as traditional physical joints (hinges, balls-and-socket joints, etc.), these joints are hard to tune manually to obtain customized results and often look unnatural, because they model (hard) mechanical assemblies, rather than virtual characters that exhibit soft ranges of motion. Many of the solutions provided by the IK solvers may not be physically plausible and/or may not be visually pleasing even if they satisfy target end-effector positions as specified by a user, since the IK solvers may not take the biomechanics of the skeleton into consideration.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method to display a virtual character within a virtual environment. The computer-implemented method also includes obtaining an input pose of the virtual character, where the virtual character is based on a rig that may include a plurality of joints; receiving an indication of one or more of a position and an orientation of a target end effector located on the rig, determining an output pose for the rig where the determining may include calculating a respective orientation and position of one or more joints of the plurality of joints of the rig based on the position of the target end effector and rotation constraints of a plurality of joints of a reference rig, and displaying the virtual character in the output pose in the virtual environment. Other embodiments of this aspect include corresponding computer systems, apparatus, and computer programs recorded on one or more computer storage devices, each configured to perform the actions of the methods.

In some implementations, calculating the respective orientation and position of the one or more joints for the plurality of joints of the rig may include, for each joint of the one or more joints: obtaining the rotation constraints for a corresponding joint of the reference rig; and determining, using an inverse kinematics (IK) solver, the orientation and position of the joint based on the rotation constraints for the corresponding joint of the reference rig and the position of the target end effector. Obtaining the rotation constraints for the corresponding joint may include obtaining a swing rotation and a twist rotation of the corresponding joint. Obtaining the rotation constraints for the corresponding joint may include determining the rotation constraints for the corresponding joint based on sampling a cubic polynomial. The rig may be associated with a first skeleton and the reference rig may be associated with a second skeleton, and determining the orientation and position of the one or more joints of the plurality of joints of the rig may include applying a normalization operation to the rotation constraints based on one or more of a relative size, proportion, and orientation of the first skeleton to the second skeleton. Receiving the indication of the position of the target end effector may include receiving, from a user device, a signal associated with a user dragging a point on the rig from an initial position of the target end effector to a target position of the target end effector. Receiving the indication of position of the target end effector may include receiving, from a user device, a target position for one of: an arm of the virtual character and a leg of the virtual character. Receiving the position of the target end effector may include receiving, from a user device, a target position for a particular joint of the plurality of joints. The computer-implemented method may include obtaining the rotation constraints of the plurality of joints of the reference rig from a trained machine learning model. Implementations of the described techniques may include hardware, a method or process, or computer software on a computer-accessible medium.

One general aspect includes a computer-implemented method to train a machine learning model to determine an output pose for a rig. The computer-implemented method also includes obtaining a plurality of frames that depict a virtual character in a plurality of poses, the virtual character based on a reference rig that may include a plurality of joints; analyzing the plurality of frames to determine an orientation of each joint of the plurality of joints of the reference rig in a respective pose of the plurality of poses; resolving a respective orientation of each joint of the reference rig into a swing decomposition component and a twist decomposition component; and training the machine learning model based on the swing decomposition component, the twist decomposition component, and the respective pose as input to the machine learning model, where one or more parameters of the machine learning model are updated based on a distribution of rotation constraints of the reference rig in the plurality of poses, and where, after the training, the machine learning model is capable of determining an output pose for an input rig based on an input pose and one or more of a position and an orientation of a target end effector located on the input rig. Other embodiments of this aspect include corresponding computer systems, apparatus, and computer programs recorded on one or more computer storage devices, each configured to perform the actions of the methods.

In some implementations, training the machine learning model may include learning the distribution of rotation constraints of the reference rig by fitting a two-dimensional (2D) gaussian distribution over a sphere to encode the swing decomposition component of each frame and fitting a one-dimensional (1D) gaussian distribution to encode the twist decomposition component of each frame. The machine learning model is a polynomial regression model based on the two-dimensional (2D) gaussian distribution of the swing decomposition component and the one-dimensional (1D) gaussian distribution of the twist decomposition component. Training the machine learning model may include learning the two-dimensional (2D) gaussian distribution of the swing decomposition component and the one-dimensional (1D) gaussian distribution of the twist decomposition component based on a cubic polynomial. Implementations of the described techniques may include hardware, a method or process, or computer software on a computer-accessible medium.

In some implementations, a non-transitory computer-readable medium may include instructions that when executed, perform operations that include obtaining an input pose of a virtual character, where the virtual character is based on a rig that may include a plurality of joints; receiving an indication of one or more of a position and an orientation of a target end effector located on the rig; determining an output pose for the rig where the determining may include calculating a respective orientation and position of one or more joints of the plurality of joints of the rig based on the position of the target end effector and rotation constraints of a plurality of joints of a reference rig and displaying the virtual character in the output pose in a virtual environment. Other embodiments of this aspect include corresponding computer systems, apparatus, and computer programs recorded on one or more computer storage devices, each configured to perform the actions of the methods.

Implementations may include one or more of the following features. The non-transitory computer-readable medium where calculating the respective orientation and position of one or more joints for the plurality of joints of the rig may include, for each joint of the one or more joints: obtaining, the rotation constraints for a corresponding joint of the reference rig; and determining, using an inverse kinematics (IK) solver, the orientation and position of the joint, based on the rotation constraints for the corresponding joint of the reference rig and the position of the target end effector. Obtaining the rotation constraints for the corresponding joint may include obtaining a swing rotation and a twist rotation of the corresponding joint. Receiving the indication of position of the target end effector may include receiving, from a user device, a target position for one of: an arm of the virtual character and a leg of the virtual character. Implementations of the described techniques may include hardware, a method or process, or computer software on a computer-accessible medium.

The system also includes a memory with instructions stored thereon; and a processing device, coupled to the memory, the processing device configured to access the memory and execute the instructions, where the instructions cause the processing device to perform operations including: obtaining an input pose of a virtual character, where the virtual character is based on a rig that may include a plurality of joints; receiving an indication of one or more of a position and an orientation of a target end effector located on the rig; determining an output pose for the rig, where the determining may include calculating a respective orientation and position of one or more joints of the plurality of joints of the rig based on the position of the target end effector and rotation constraints of a plurality of joints of a reference rig; and displaying the virtual character in the output pose in a virtual environment. Other embodiments of this aspect include corresponding computer systems, apparatus, and computer programs recorded on one or more computer storage devices, each configured to perform the actions of the methods.

Implementations may include the system where calculating the respective orientation and position of one or more joints for the plurality of joints of the rig may include, for each joint of the one or more joints: obtaining, the rotation constraints for a corresponding joint of the reference rig; and determining, using an inverse kinematics (IK) solver, the orientation and position of the joint, based on the rotation constraints for the corresponding joint of the reference rig and the position of the target end effector. The rig is associated with a first skeleton and the reference rig is associated with a second skeleton, and where determining the orientation and position of the one or more joints of the plurality of joints of the rig may include applying a normalization operation to the rotation constraints based on one or more of a relative size, proportion, and orientation of the first skeleton to the second skeleton. Implementations of the described techniques may include hardware, a method or process, or computer software on a computer-accessible medium.

DETAILED DESCRIPTION

Figure 1:
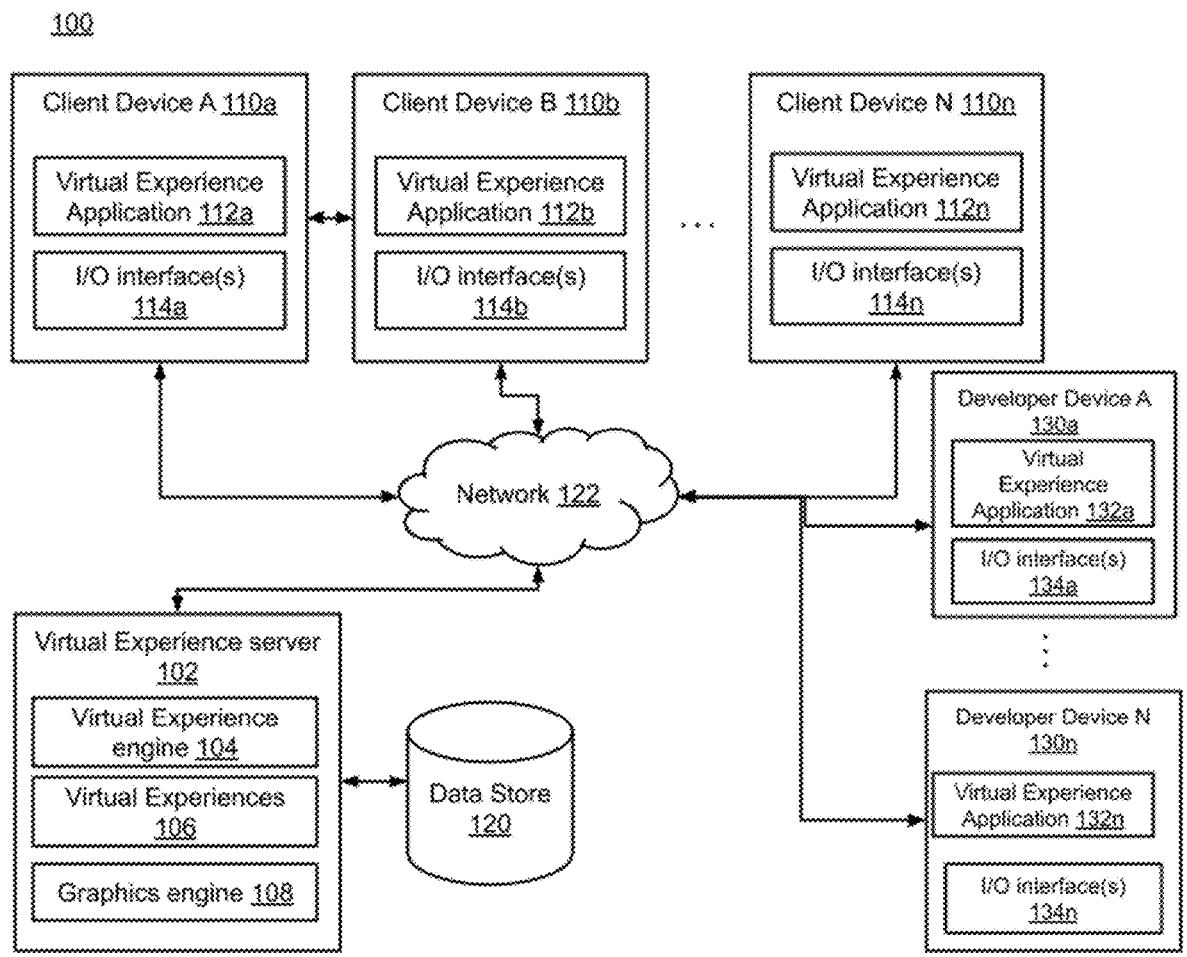
FIG. 1 is a diagram of an example system architecture for simulation of rigid body objects, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

Virtual experience platforms (also referred to as "user-generated content platforms" or "user-generated content systems") offer a variety of ways for users to interact with one another. For example, users of a virtual experience platform may work together towards a common goal, share various virtual objects, send electronic messages to one another, and so forth. Users of a virtual experience platform may join virtual experiences as virtual characters, playing specific roles. For example, a virtual character may be part of a team or multiplayer environment wherein each character is assigned a certain role and has associated parameters, e.g., related to clothing, armor, weaponry, skills, etc. that correspond to the role. In another example, a virtual character may be joined by computer-generated characters, e.g., when a single user is part of a virtual experience.

The virtual experience platform may also enable users of the platform to create and animate new characters and avatars. For example, users of the virtual experience platform may be enabled to create, design, and customize new virtual characters (avatars).

In some implementations, users may be enabled to create animation routines that may include virtual characters that move one or more body parts to simulate movement such as walking, running, jumping, dancing, fighting, wielding a weapon such as a sword, etc. In some implementations, characters may generate facial expressions, where a part of or an entire body of the character moves. Animations may correspond to various movement styles, e.g., graceful, warrior-like, balletic, etc., and may mimic the movement of popular real and fictional characters.

In some implementations, advanced tools may be provided to users, e.g., developer users, to create realistic procedural animations on rigs (skeletons) that include an Inverse Kinematics (IK) solver. The inverse kinematics solver may enable a developer user (animator) to select (grab) and place the end of a kinematic chain (end-effector), such as a foot or hand of a virtual character to indicate a target position and/or orientation for the end-effector, based on which, the IK solver can automatically solve for the positions and orientations of intermediate joints and end-effector that satisfy the provided constraints. The IK solver can also be utilized to ensure that virtual characters accurately make contact with their virtual environment.

The animation tool may enable users to design poses for virtual characters, e.g., hold weapons and tools; reach for objects, buttons, door handles, etc.; place feet of the virtual character realistically on the ground during movement, jumps, etc.; aim weapons; view points of interest, e.g., through a telescope, binoculars, etc.; design a scene wherein two virtual characters shake their hands or hug each other; pose characters by just moving their hands or feet, etc. The designed poses can subsequently be utilized in virtual environments, exchanged or bartered with other users on a virtual experience platform, traded for virtual currency, etc.

In virtual experience platforms that support user-generated content, there can be a large variety of user-generated characters with different proportions and ranges of motion. Techniques described herein can enable customization of a variety of virtual characters and provide an out-of-the-box solution that can support animation of virtual characters based on multiple types of rigs (skeletons), e.g., R6 based virtual characters, R15 based virtual characters, etc.

A distribution of weighted joint angles over all rotations (in quaternion-space) is learned for a reference rig based on animation clips, frames, etc., that include virtual characters based on the reference rig. The quaternions representing the rotations are split into swing and twist components. The distribution is learned using a set of animations (or mocap) and expresses the likelihood and density of a joint angle in the rig. In some implementations, the likelihood and density of a joint angle can be conditioned on other joint angles, e.g., angles of adjacent joints in the rig. The distribution of joint angles can be simplified and regressed over the unit sphere to reduce the space required to store it and enable fast sampling at runtime.

The swing-twist decomposition may enable easier implementation of the IK solver, visualization of the joint angles, and is relatively easy to integrate with existing solvers. The distribution parametrized by the rotations is utilized to drive the final pose of the solver. The techniques can be utilized with various rig schemes, e.g., standard R15 characters, standard R5 characters, standard R6 characters, standard R16 characters, etc., of different proportions, and can be augmented by developers to support creatures with different skeletons and/or proportions, only requiring sample clips of animation from them.

Joints usually change their range of motion based on the configuration of other joints, especially previous ones, e.g., the elbow's range of motion is influenced by the range of motion of the shoulder and clavicle joints, which in turn is affected by the spine configuration.

The distribution of multiple joint angles can be used to extract a vector field describing the most likely pose of a given joint based on the conditional positions and rotations of previous joints and/or possible future joints. When computing this vector field, the rig (skeleton) is normalized so that the results can be applied to a wide range of rigs (skeletons) with different proportions and initial poses.

FIG. 1 is a diagram of an example system architecture for simulation of rigid body objects, in accordance with some implementations. FIG. 1 and the other figures use like (similar) reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110a," "110b," and/or "110n" in the figures).

The system architecture 100 (also referred to as "system" herein) includes virtual experience server 102, data store 120, client devices 110a, 110b, and 110n (generally referred to as "client device(s) 110" herein), and developer devices 130a and 130n (generally referred to as "developer device(s) 130" herein). Virtual experience server 102, data store 120, client devices 110, and developer devices 130 are coupled via network 122. In some implementations, client devices(s) 110 and developer device(s) 130 may refer to the same or same type of device.

Virtual experience server 102 can include, among other things, a virtual experience engine 104, one or more virtual experiences 106, and graphics engine 108. In some implementations, the graphics engine 108 may be a system, application, or module that permits the virtual experience server 102 to provide graphics and animation capability. In some implementations, the graphics engine 108 may perform one or more of the operations described below in connection with the methods illustrated in FIG. 5 and FIG. 6. A client device 110 can include a virtual experience application 112, and input/output (I/O) interfaces 114 (e.g., input/output devices). The input/output devices can include one or more of a microphone, speakers, headphones, display device, mouse, keyboard, virtual experience controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, virtual experience controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the virtual experience server 102 can include a server having one or more computing devices (e.g., a cloud computing system, a rackmount server, a server computer, cluster of physical servers, etc.). In some implementations, the virtual experience server 102 may be an independent system, may include multiple servers, or be part of another system or server.

In some implementations, the virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the virtual experience server 102 and to provide a user with access to virtual experience server 102. The virtual experience server 102 may also include a website (e.g., a web page) or application back-end software that may be used to provide a user with access to content provided by virtual experience server 102. For example, users may access virtual experience server 102 using the virtual experience application 112 on client devices 110.

In some implementations, virtual experience session data are generated via virtual experience server 102, virtual experience application 112, and/or virtual experience application 132, and are stored in data store 120. With permission from virtual experience players, virtual experience session data may include associated metadata, e.g., virtual experience identifier(s); device data associated with the players; demographic information of the player(s); virtual experience play session identifier(s); chat transcripts; session start time, session end time, and session duration for each player; relative locations of participant avatar(s) within a virtual experience environment; in-virtual experience purchase(s) by one or more player(s); accessories utilized by virtual experience players; etc.

In some implementations, virtual experience server 102 may be a type of social network providing connections between users or a type of user-generated content system that allows users (e.g., end-users or consumers) to communicate with other users on the virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between players.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different virtual experience sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, virtual experience server 102 may be a virtual gaming server. For example, the gaming server may provide single-player or multiplayer virtual experiences to a community of users that may access or interact with virtual experiences using client devices 110 via network 122. In some implementations, virtual experiences (also referred to as "video virtual experience," "online virtual experience," or "virtual experience" herein) may be two-dimensional (2D) virtual experiences, three-dimensional (3D) virtual experiences (e.g., 3D user-generated virtual experiences), virtual reality (VR) virtual experiences, or augmented reality (AR) virtual experiences, for example. In some implementations, users may participate in virtual experiences with other users. In some implementations, a virtual experience may be played in real-time with other users of the virtual experience.

In some implementations, virtual experiences may refer to the interaction of one or more players using client devices (e.g., 110) within a virtual experience (e.g., 106) or the presentation of the interaction on a display or other output device (e.g., 114) of a client device 110.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a three-dimensional (3D) environment. The one or more environments of a virtual experience 106 may be collectively referred to as a "world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

Three-dimensional (3D) environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the virtual experience server 102 can host one or more virtual experiences 106 and can permit users to interact with the virtual experiences 106 using a virtual experience application 112 of client devices 110. Users of the virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience virtual experience objects, such as in-platform currency (e.g., virtual currency), with other users of the virtual experience server 102. In some implementations, virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the virtual experience server 102 hosting virtual experiences 106, is provided for purposes of illustration. In some implementations, virtual experience server 102 may host one or more media items that can include communication messages from one user to one or more other users. With user permission and express user consent, the virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the virtual experience server 102 (e.g., a public virtual experience). In some implementations, where virtual experience server 102 associates one or more virtual experiences 106 with a specific user or group of users, virtual experience server 102 may associate the specific user(s) with a virtual experience 106 using user account information (e.g., a user account identifier such as username and password).

In some implementations, virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of virtual experience server 102, or a combination of both.

In some implementations, both the virtual experience server 102 and client devices 110 may execute a virtual experience engine (104 and 112, respectively). The virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the virtual experience server 102 and the virtual experience engine functions that are performed on the client devices 110. For example, the virtual experience engine 104 of the virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the virtual experience server 102 and client device 110 may be changed (e.g., dynamically) based on virtual experience conditions. For example, if the number of users participating in virtual experiences of a particular virtual experience 106 exceeds a threshold number, the virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the virtual experience server 102. Subsequent to receiving control instructions from the client devices 110, the virtual experience server 102 may send virtual experience instructions (e.g., position and velocity information of the characters participating in the group virtual experience or commands, such as rendering commands, collision commands, etc.) to the client devices 110 based on control instructions. For instance, the virtual experience server 102 may perform one or more logical operations (e.g., using virtual experience engine 104) on the control instructions to generate virtual experience instruction(s) for the client devices 110. In other instances, virtual experience server 102 may pass one or more of the control instructions from one client device 110 to other client devices (e.g., from client device 110a to client device 110b) participating in the virtual experience 106. The client devices 110 may use the virtual experience instructions and render the virtual experience for presentation on the displays of client devices 110.

In some implementations, the control instructions may refer to instructions that are indicative of in-virtual experience actions of a user's character. For example, control instructions may include user input to control the in-virtual experience action, such as right, left, up, down, user selection, gyroscope position and orientation data, force sensor data, etc. The control instructions may include character position and velocity information. In some implementations, the control instructions are sent directly to the virtual experience server 102. In other implementations, the control instructions may be sent from a client device 110 to another client device (e.g., from client device 110b to client device 110n), where the other client device generates virtual experience instructions using the local virtual experience engine 104. The control instructions may include instructions to play a voice communication message or other sounds from another user on an audio device (e.g., speakers, headphones, etc.).

In some implementations, virtual experience instructions may refer to instructions that enable a client device 110 to render scenes from a virtual experience, such as a multiplayer virtual experience. The virtual experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of possibly interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g., shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g., shirts, pants, etc. the online gaming platform may provide users access to simplified 3D virtual object models that are represented by a mesh of a low polygon count, e.g., between about 20 and about 3000 polygons.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character virtual experience object (e.g., body parts, etc.) but the user may control the character (without the character virtual experience object) to facilitate the user's interaction with the virtual experience (e.g., a puzzle virtual experience where there is no rendered character virtual experience object, but the user still controls a character to control in-virtual experience action).

In some implementations, a component, such as a body part, may be a primitive geometrical shape such as a block, a cylinder, a sphere, etc., or other primitive shape such as a wedge, a torus, a tube, a channel, etc. In some implementations, a creator module may publish a user's character for view or use by other users of the virtual experience server 102. In some implementations, creating, modifying, or customizing characters, other virtual experience objects, virtual experiences 106, or virtual experience environments may be performed by a user using a I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the virtual experience server 102 may store characters created by users in the data store 120. In some implementations, the virtual experience server 102 maintains a character catalog and virtual experience catalog that may be presented to users. In some implementations, the virtual experience catalog includes images of virtual experiences stored on the virtual experience server 102. In addition, a user may select a character (e.g., a character created by the user or other user) from the character catalog to participate in the chosen virtual experience. The character catalog includes images and/or other representations of characters stored on the virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 110 and allows users to interact with virtual experience server 102. The virtual experience application may render, display, or present the content (e.g., a web page, a media viewer) to a user. In an implementation, the virtual experience application may also include an embedded media player that is embedded in a web page.

According to aspects of the disclosure, the virtual experience application may be an virtual experience server application for users to build, create, edit, upload content to the virtual experience server 102 as well as interact with virtual experience server 102 (e.g., play virtual experiences 106 hosted by virtual experience server 102). As such, the virtual experience application may be provided to the client device(s) 110 by the virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with virtual experience server 102, such as control a virtual character in a virtual experience hosted by virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to client device 130 and allows developer users to interact with virtual experience server 102. The virtual experience application may render, display, or present the content (e.g., a web page, a media viewer) to a developer user. In an implementation, the virtual experience application may also include an embedded media player that is embedded in a web page.

According to aspects of the disclosure, the virtual experience application 132 may be a virtual experience server application for users to build, create, edit, upload content to the virtual experience server 102 as well as interact with virtual experience server 102 (e.g., provide and/or play virtual experiences 106 hosted by virtual experience server 102). As such, the virtual experience application may be provided to the client device(s) 130 by the virtual experience server 102. In another example, the virtual experience application 132 may be an application that is downloaded from a server. Virtual experience application 132 may be configured to interact with virtual experience server 102 and obtain access to user credentials, user currency, etc. for one or more virtual experiences 106 developed, hosted, or provided by a virtual experience developer.

In some implementations, a user may login to virtual experience server 102 via the virtual experience application. The user may access a user account by providing user account information (e.g., username and password) where the user account is associated with one or more characters available to participate in one or more virtual experiences 106 of virtual experience server 102. In some implementations, with appropriate credentials, a virtual experience developer may obtain access to virtual experience objects, such as in-platform currency (e.g., virtual currency), avatars, special powers, accessories, that are owned by or associated with other users.

In general, functions described in one implementation as being performed by the virtual experience server 102 can also be performed by the client device(s) 110, or a server, in other implementations if appropriate. In addition, the functionality attributed to a particular component can be performed by different or multiple components operating together. The virtual experience server 102 can also be accessed as a service provided to other systems or devices through suitable application programming interfaces (APIs), and thus is not limited to use in websites.

Figure 2:
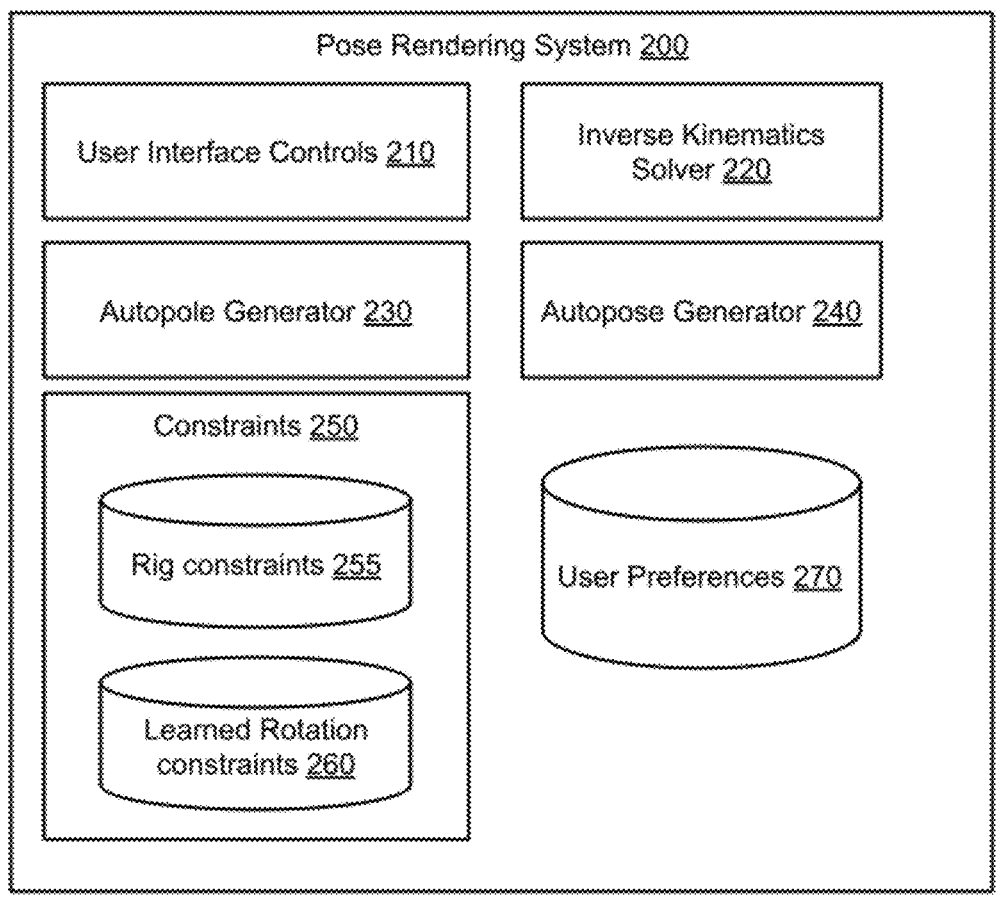
FIG. 2 depicts an example pose rendering system, in accordance with some implementations.

FIG. 2 depicts an example pose rendering system, in accordance with some implementations. As depicted in FIG. 2, pose rendering system 200 includes a user interface controls module 210, an inverse kinematics solver 220, an AutoPole generator 230, and an AutoPose generator 240. Pose rendering system 200 additionally includes constraints storage 250 and user preferences storage 270. Constraints storage 250 may further include rig constraints 255 and learned rotation constraints 260.

Pose rendering system 200 can be utilized to determine a pose of a virtual character (avatar) based on input conditions, e.g., current pose, target position of one or more joints and/or end-effectors, etc.

User interface controls module 210 can be utilized to process inputs received from one or more user interfaces associated with devices, e.g., display devices, mouse devices, game controllers, etc. For example, the user interface controls module 210 can be utilized to determine specific positions of end-effectors and/or joints of a virtual character that are indicated by a user, e.g., an intended position on one or more end-effectors such as a hand or foot.

Inverse Kinematics (IK) solver 220 is utilized to determine a final set of positions and/or orientations for one or more joints of a skeleton such that the virtual character attains a pose where a specified joint or end-effector is placed at a target position and/or orientation. The IK solver applies a process to a chain or hierarchy of bones of the virtual character to determine a set of intermediate and/or final positions in such a way that a target position is realized based on a specified target position.

During the application of the IK solver, the IK solver determines a suitable (e.g., optimal, near optimal, etc.) solution to satisfy constraints 250, e.g., such that constraints of the joints, skeleton, bones, etc., are not violated. For example, a bone may not be extendible, and consequently, the length of the bone may not be changed. Similarly, joints can be adjusted but only within bounds that are permissible for that joint. The constraints may be mathematical constraints based on biomechanics of the rig and may be specified such that the movements of the virtual character mimics movements and/or poses that are observed in the real world, e.g., movement and poses of humans, animals, etc.

The IK solver operates on an under-determined problem, e.g., for a given target position of specified end-effector or joint, there may be many possible solutions for each of the joints and/or collection of joints (and therefore, many possible final poses) in the rig (skeleton) that can include the specified end-effector in its specified target position. In some implementations, the IK solver is utilized to identify a first solution to the positions of joints in a skeleton that satisfies the provided constraints and the final position of the end-effector, and the first solution may be provided as the solution by the IK solver.

Constraints 250 may include length constraints, e.g., for bones in the rig, and angular constraints. In some implementations, in addition to length constraints, angular constraints may be applied to the joints based on specified type of joints. In some implementations, the specified type of joint may be a mechanical joint. For example, an elbow joint may be modeled as a hinge joint to restrict the motion of the elbow joint, a shoulder joint modeled as a ball and socket joint, etc.

In some implementations, as described herein, constraints may be specified based on additional considerations, e.g., constraints based on movements of actual joints in the real world. For example, constraints for joints can be specified to ensure that joints like elbows and knees of a virtual character bend naturally, or to make the joints rotate in a specific orientation.

Techniques herein can be utilized to add additional constraints, e.g., rotation constraints for one or more joints, that can be utilized by the IK solver to determine a final output pose for a virtual character. In some implementations, the additional constraints may be provided as a range of values for one or more joints of a plurality of joints of a rig. In some implementations, additional constraints may be provided as exact values for one or more joints of a plurality of joints in a rig, and as a range of values for the remainder of the joints of the plurality of joints in the rig.

AutoPole generator 230 may be utilized to provide additional constraints that can be applied to a subset of joints, e.g., limbs (arms and legs) of a skeleton. The AutoPole generator 230 can be utilized to specify additional constraints that can apply to a shoulder, elbow, wrist, hip, knee, ankle, etc.

In some implementations, AutoPole generator 230 is a system external to the IK solver that provides additional constraints and/or parameters to the IK solver. In some implementations, given an intermediate pose that specifies a position and/or orientation of one or more joints, AutoPole generator 230 may be utilized to estimate a most likely position/orientation of joints in the pose based on pre-computed weights, e.g., weights that are based on a trained model such as a fitted polynomial function. The weights may be provided to the IK solver as additional constraints or poles, which may be taken into account during the next iteration of the IK solver. In some implementations, the pole is an additional point in 3D space that can be utilized to determine a direction of bend of a kinematic chain (e.g., a particular preferred direction for a bend of a knee or elbow). In this manner, by performing multiple iterations, a preferred position and/or orientation of one more joints may be realized.

For example, in a scenario where a target position is specified by a user for an arm of a virtual character, AutoPole generator 230 may utilize an input pose to determine a likely position of the elbow based on a learned distribution of joints from a reference skeleton. The likely position of the elbow may be provided to the IK solver, which is now further constrained and generates an output pose which may be displayed, e.g., on a screen of a device.

AutoPose generator 240 can be utilized to provide additional constraints that can be applied to all joints on a skeleton, and can be applied to a variety of topologies.

In some implementations, AutoPose generator 240 system is utilized to encode a most-likely position/orientation for joints, in addition to encode the mean and standard deviation of how joints respond to a given configuration of joint positions/orientations.

In some implementations, the AutoPose generator 240 is utilized to perform (run) a relaxation step that makes a particular joint converge to a likely position/orientation based on the encoded parameters. Multiple iterations of AutoPose generation and the IK solver may be performed to determine a pose that satisfies the target position and/or orientation of an end effector as well as lies within the encoded distributions of the joint positions and/or orientations.

In some implementations, the AutoPose generator 240 may be integrated directly into the IK solver. An input pose may be provided to the integrated IK solver. A relaxation step may be performed during each iteration of the IK solver, leading to each joint slowly converging to the learned distribution. The IK solver and AutoPose generator are executed in alternating steps until the final output pose is computed, and the different mathematical targets can enable a final output pose that satisfies both goals. For example, the IK solver operates with an objective for a final pose that includes a position and/or orientation of the target end effector at the specified (indicated) target position and/or orientation. The AutoPose generator operates with an objective for a final pose that includes a position and/or orientation for one or more joints that lies within the learned distribution for the joints.

Pose rendering system 200 additionally includes stored constraints 250 and user preferences 270.

Constraints 250 is a database (or other data store) that is utilized to store constraints associated with the rig and may include rig constraints 255 and learned rotation constraints 260.

Rig constraints may include constraints, e.g., length constraints, angular constraints, mechanical constraints, etc., associated with different types of rigs, and may be modified by users.

Learned rotation constraints 260 is a database (or other data store) that can include learned rotation constraints for one or more joints based on previously provided poses, training sets of animation data, motion capture animation (mocap) data, etc.

User preferences 270 is a database (or other data store) that can store user preferences of joint positions, poses, constraints, etc., based on previously provided poses and user preferences that may be obtained directly and indirectly.

Figure 3:
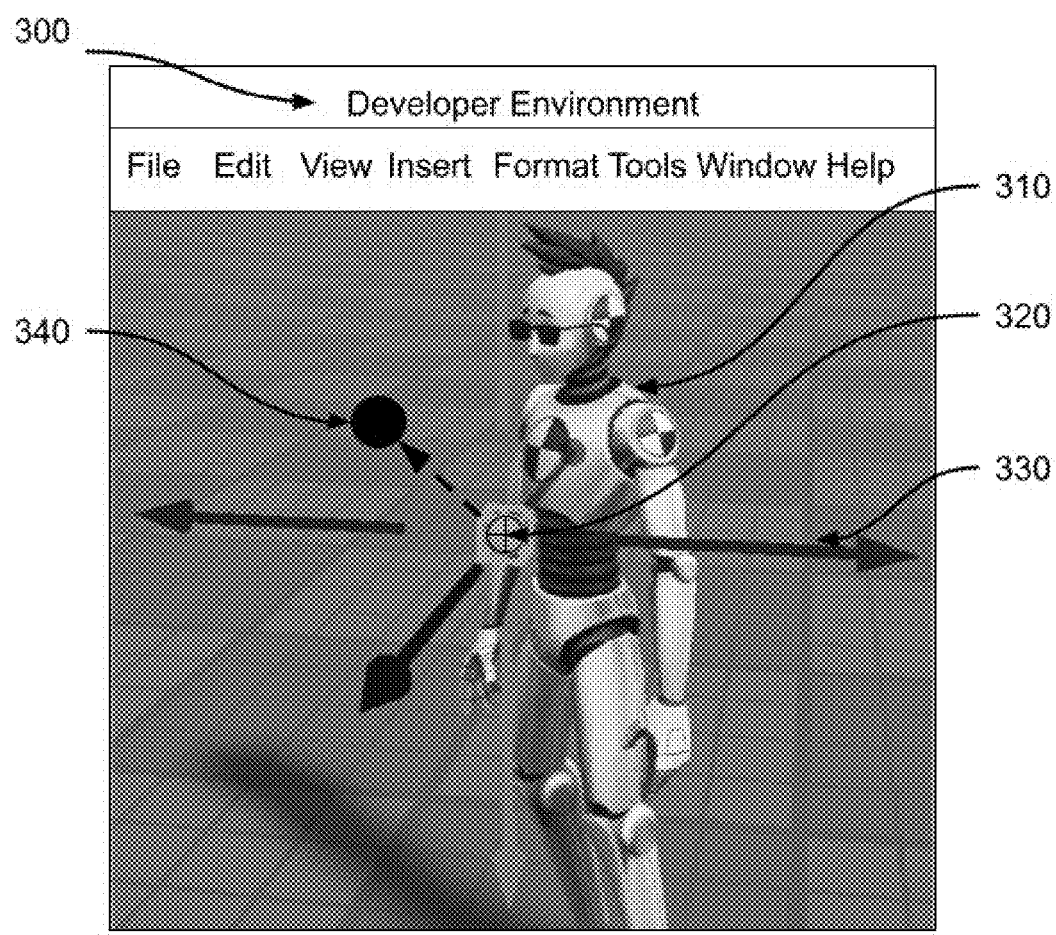
FIG. 3 is a diagram illustrating an example user interface within a developer environment, in accordance with some implementations.

FIG. 3 is a diagram illustrating an example user interface within a developer environment, in accordance with some implementations.

FIG. 3 shows an example of a virtual experience development environment (developer tool) 300, in accordance with some implementations. The virtual experience development environment may provide a user interface that enables a developer user to design and/or create virtual experiences, e.g., games. One example of the virtual experience development environment is Roblox™ Studio from Roblox™ Corporation. Other development tools and development environments may be used in various embodiments. The virtual experience development environment 300 may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The virtual experience development environment 300 may be operated by a developer of a virtual experience, e.g., a virtual experience developer or any other person who seeks to create a virtual experience that may be published by an online virtual experience platform and utilized by others. The user interface of the virtual experience development environment may be rendered on a display screen of a client device, e.g., such as a developer device 130 described with reference to FIG. 1, so as to enable the creator/developer to interact with the development environment 300 using actions such as typing, highlighting, selecting, drag and drop, clicking, and so forth via a mouse, keyboard, or other input device configured to communicate with the user interface. The user interface may include a menu bar, a tool bar, a workspace pane, and a plurality of secondary panes. Depending on the particular implementation, the user interface may include alternative or additional elements, arrangements, operational features, etc. of the virtual experience development environment than what is shown and described herein with respect to in FIG. 3. Thus, it is understood that the various elements and operation of the example virtual experience development environment and user interface shown in FIG. 3 are for purposes of illustration and explanation herein and that variations/modifications thereof are possible.

A developer user (creator) may utilize the virtual experience development environment to create virtual experiences. As part of the development process, the developer/creator may upload various types of digital content such as image files, audio files, avatars (virtual characters), short videos, motion sequences, animation clips, etc., to enhance the virtual experience. For example, a developer user may specify one or more poses of a virtual character (avatar) to be utilized in a virtual experience.

In this illustrative example, FIG. 3 depicts a virtual character 310 in a particular pose. A developer user may define a new pose for the virtual character by utilizing tools provided within the virtual experience development environment. A particular end effector, e.g., a right hand joint can be moved from a current position 320 to a target position 340.

Axis marking(s) 330 or other forms of manipulators may be provided to guide the user developer. In some implementations, other visual markings may be provided to assist the user to specify a pose or position of one or more joint(s). The developer user may indicate a target position and/or orientation by selecting a particular end-effector and/or joint and dragging the visual representation of the end-effector to a target position and/or orientation, e.g., by using a mouse, moving with a finger on a touchscreen device, etc. In some implementation, a target position and/or orientation of a target end effector may be set via a script, by an animation, or other methods.

Figure 4A:
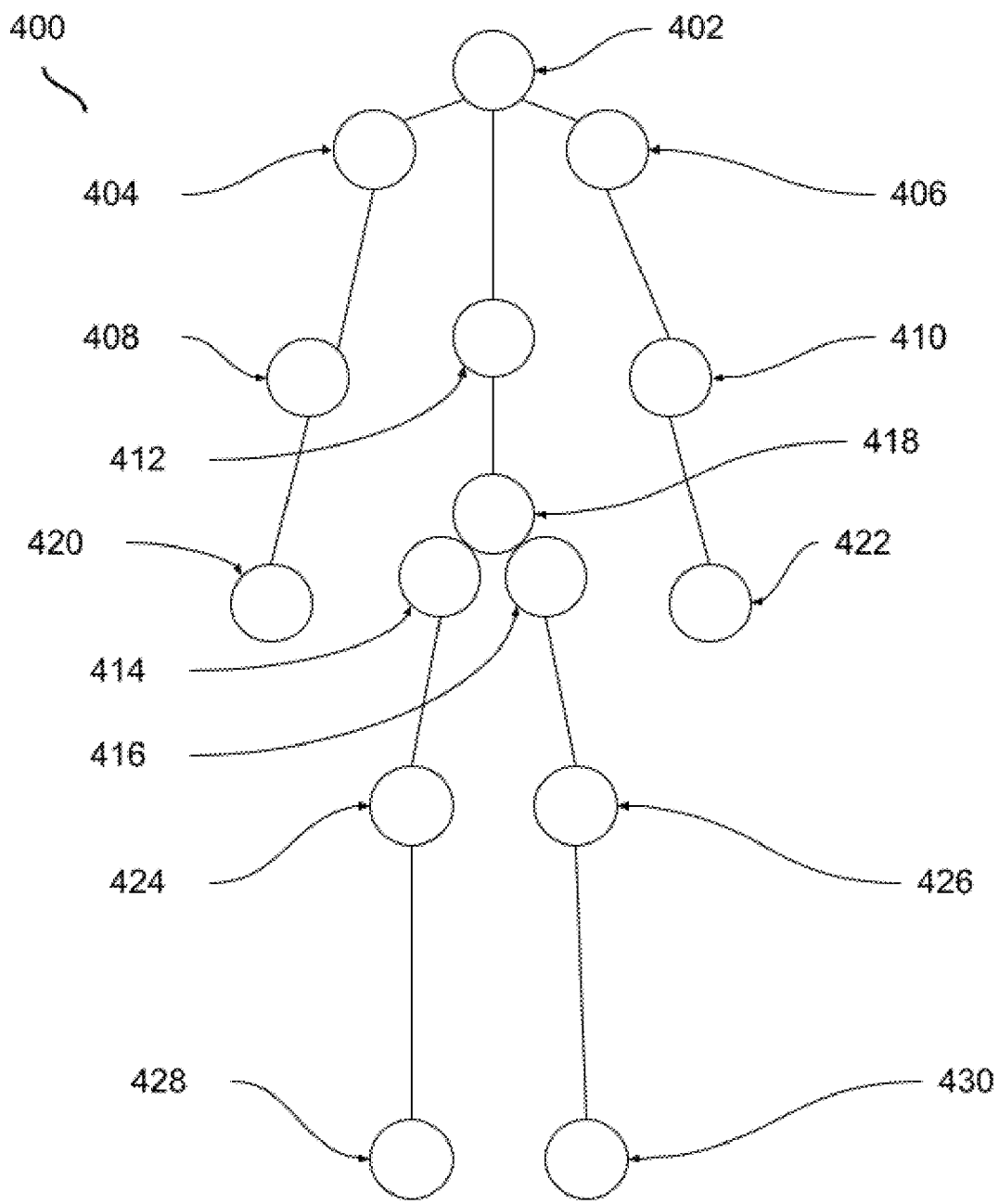
FIG. 4A is a diagram illustrating a three dimensional (3D) example skeleton (rig) in accordance with some implementations.

FIG. 4A is a diagram illustrating a three dimensional (3D) example skeleton (rig) in accordance with some implementations.

Virtual characters (avatars) and animation routines that include the virtual characters can be designed by utilizing rigging (skeletal animation) whereby a virtual character or virtual object is represented by a rig (skeleton) that includes a set of hierarchical, interconnected parts, and a mesh (skin) that provides a surface representation for the virtual character.

Animation of a virtual character is modeled by movement of one or more virtual bones in the rig. Virtual bones in the rig provide a skeleton structure for the virtual character and movement of one or more virtual bones simulates particular movements of the virtual character. built to identify the virtual bones that allow the model to move.

Various implementations can utilize various types of rigs, e.g., a rig with 6 joints is referred to as an R6 rig, a rig with 15 joints is referred to as a R15 rig, etc.

In some implementations, the virtual character is implemented as a 3D model and includes a representation of a surface representation used to draw the virtual character (also known as a skin or mesh) and a hierarchical set of interconnected bones (also known as a skeleton or rig). The rig may be utilized to animate the virtual character and to simulate motion and action by the virtual character. The 3D model may be represented as a data structure, and one or more parameters of the data structure may be modified to change various properties of the virtual character, e.g., dimensions (height); movement style; number/type of body parts, etc.

In the illustrative example depicted in FIG. 4A, the character includes a rig with 15 points, sometimes referred to as an R15 rig. The rig includes points that represent the neck (402), shoulder joints (404, 406), elbow joints (408, 410), waist (412), hip joints (414, 416), root (418), wrist (420, 422), knee joints (424, 426), and ankle joints (428, 430).

Tools such as the developer environment 300 described with reference to FIG. 3, may be utilized by a user, e.g., a developer user, to create, import, and/or customize rigs as well design animations, poses, etc.

Figure 4B:
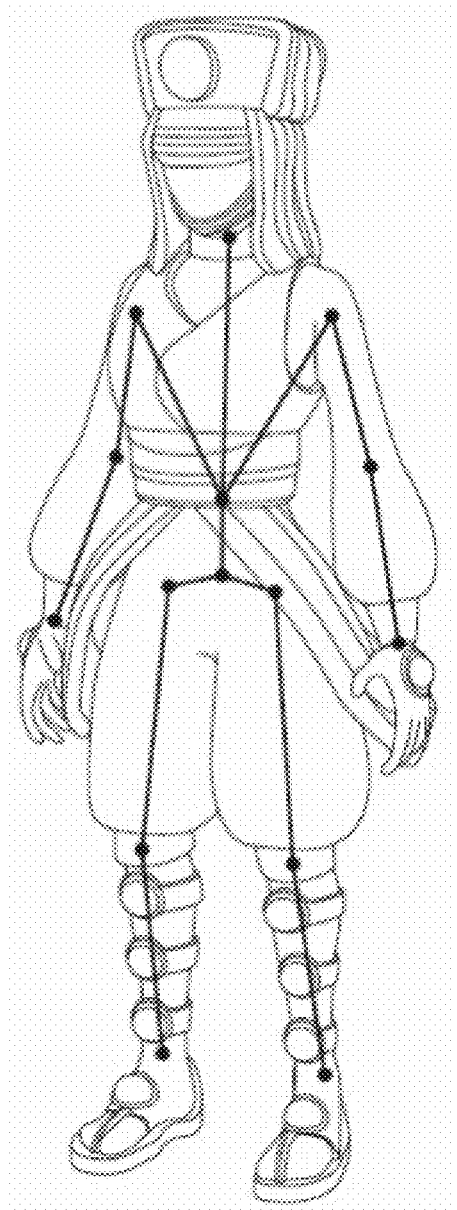
FIG. 4B is a diagram illustrating an example virtual character that is based on a skeleton g) in accordance with some implementations.

FIG. 4B is a diagram that illustrates an example virtual character that is based on a skeleton (rig) in accordance with some implementations.

In some implementations, the body parts and/or joints may be connected by a mesh that provides a definition for a shape of the character. In some implementations, additional patterns and/or textures may be added to the character. In some implementations, the character may be augmented with accessories (for example, tools, weapons, etc.).

In some implementations, dimensions of body parts, layout of rig points, distance between the points, etc. are provided by a user at a time of set-up. In some implementations, predetermined dimensions (via examples, libraries, etc.) may be provided to the user for selection.

FIG. 4B depicts an example virtual character that is based on an R15 rig, e.g., similar to rig 400 described with reference to FIG. 4A. As can be observed, a mesh (skin) is fitted to the rig to create a particular virtual character. Additional items such as textures, accessories such as clothing items, weapons, etc. can be added to the virtual character.

Modifications can be made to extend the dimension of one or more body parts by extending a distance between joints. For example, based on the same R15 rig, different virtual characters can be created, e.g., virtual characters with longer arms, a longer neck, shorter legs, etc.

Figure 4C:
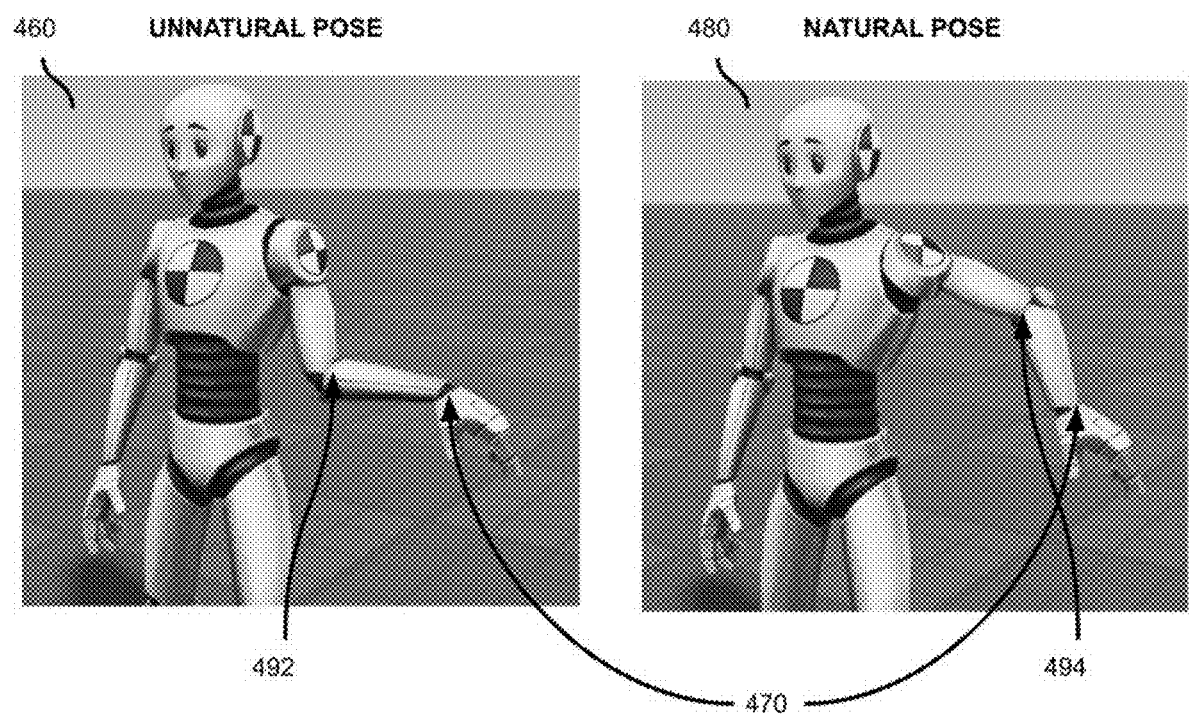
FIG. 4C depicts examples of unnatural and natural poses of a virtual character, in accordance with some implementations.

FIG. 4C depicts examples of unnatural and natural poses of a virtual character.

A pose of a virtual character is based on specification of positions/orientations of one or more joints, bones etc., such that a particular appearance/form of virtual character can be specified and/or rendered on a display screen. Stationary poses can be utilized as images, thumbnails. Animation routines can be designed based on transitions from one pose to another.

In this illustrative example, a virtual character is depicted in an unnatural pose 460 and a natural pose 470. Both the poses can be realized or reached starting from the same input pose, and the same target position 470 of an end-effector. In this illustrative example, the wrist joint is the end effector that is utilized by a user to indicate a target position. Additionally, both poses can be compliant with the specified constraints associated with joints. Realization of realistic poses may require the specification of additional constraints to the rig beyond the mechanical constraints.

In some cases, additional constraints can be specified based on artistic factors and to depict particular mannerisms and particular forms of movement. For example, sportspersons, artistes, dancers etc. may have special custom movements that a user may want to utilize in a virtual character.

Figure 5:
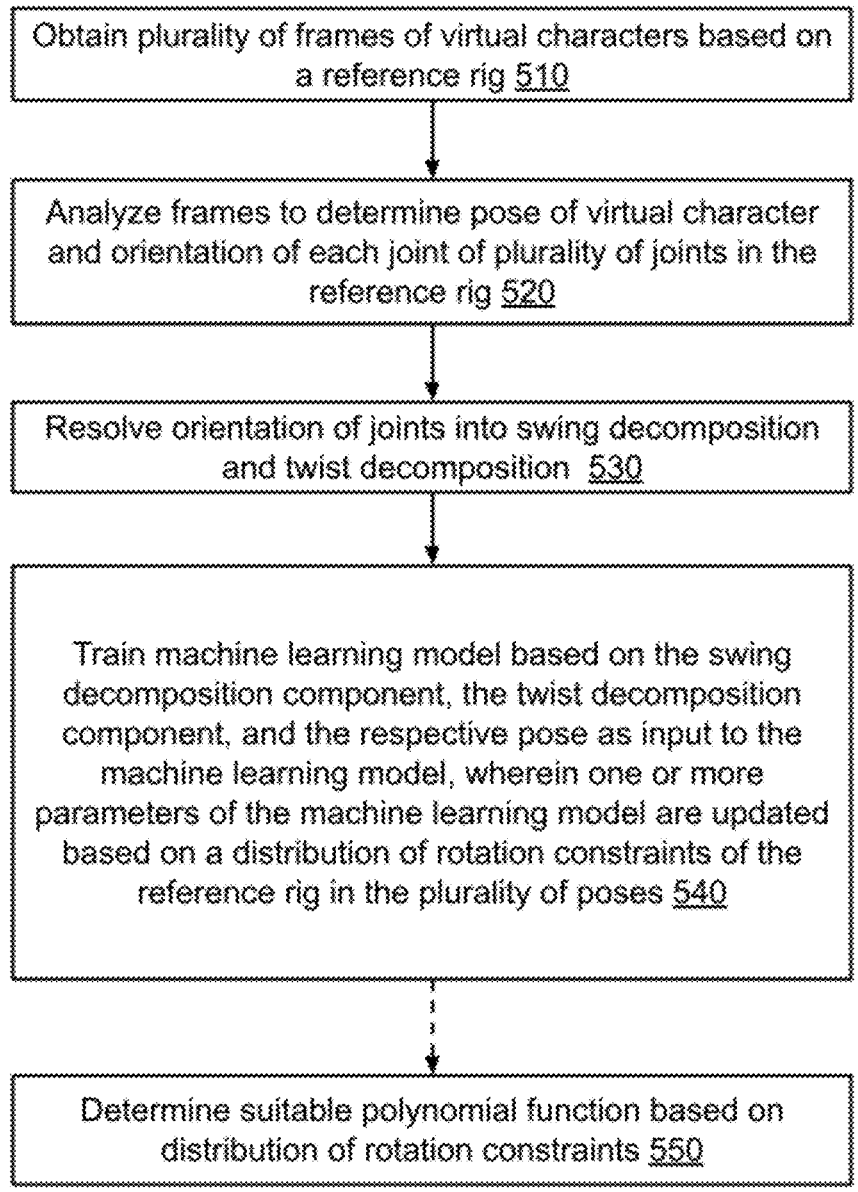
FIG. 5 is a flowchart that illustrates an example method to train a machine learning model to determine an output pose for a rig based on a learned distribution of rotation constraints for a reference rig, in accordance with some implementations.

FIG. 5 is a flowchart that illustrates an example method to train a machine learning model to determine an output pose for a rig based on a learned distribution of rotation constraints for a reference rig, in accordance with some implementations.

In some implementations, method 500 can be implemented to train a machine learning model to determine an output pose for a rig based on a distribution of rotation constraints for a reference rig for use in a virtual experience, for example, on virtual experience server 102 described with reference to FIG. 1. In some other implementations, method 500 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, method 500 is a computer-implemented method to learn a distribution of rotation constraints of a plurality of joints of a reference rig. Method 500 may begin at block 510.

At block 510, a plurality of frames (poses) that include a virtual character in a plurality of poses are obtained. The virtual character may be based on a reference rig that comprises a plurality of joints. In some implementations, the virtual character is based on a particular type of rig, e.g., R6 rig, R15 rig, that may be the same as the reference rig or that may be different from the reference rig (e.g., the reference rig may be an R15 rig while the virtual character may be based on an R16 rig). In some implementations, each of the plurality of frames may depict a virtual character that is similar in structure to the reference rig. In some implementations, the plurality of frames may include a virtual character that has the same number of joints as the reference rig.

In some implementations, the frames may include multiple virtual characters, and method 500 may include distinguishing the virtual characters that are of the same structure as the reference rig. In some implementations, method 500 may be performed based on virtual characters based on a first type of rig, and may be performed subsequently based on virtual characters based on a second type of rig.

The frames may be obtained from images, animation routines, motion capture (mocap), etc., that feature (include) the virtual character. In some implementations, the frames may be obtained from a sequence of video frames that include a sequential display of the virtual character (rig) in different poses. For example, the frames may include frames that feature the virtual character (and corresponding rig) in movements such as dancing, performing athletic activities, fighting poses, etc. In some cases, mocap frames may capture a real world person (e.g., a sportsperson) wearing sensors such that their particular motion may be recorded and used for animation. Block 510 may be followed by block 520.

At block 520, each frame of the plurality of frames is analyzed to determine an orientation of each joint of the plurality of joints in the rig in a respective pose of the plurality of poses. Determining the orientation of the joint can include determining a position of the joint, an angle formed by bones associated with the joint, and additional coordinates that may be utilized to specify how the joint is placed in three-dimensional space. In some implementations, the analysis includes identification of virtual character (s) in the frame, identifying each joint in the plurality of joints in the rig of the virtual character(s), and determining an orientation of each joint. For example, if a single virtual character that is constructed based on an R15 rig is identified in a particular frame, the position of 15 joints in the rig and their corresponding orientations may be determined. Block 520 may be followed by block 530.

At block 530, the orientation of each joint of the reference rig determined based on the analysis is resolved (decomposed) into a swing decomposition component and a twist decomposition component. The resolution into the components is performed by applying a swing-twist decomposition operation that splits a rotation into two concatenated rotations, a swing rotation and a twist rotation. In some implementations, a particular twist axis is selected, and a portion of the orientation being resolved that contributes to the twist around this axis is determined to be a twist component, and the remainder of the orientation being resolved is determined as the swing component.

In some implementations, a normalization operation may be performed to the rig of the virtual character in each frame based on rig (skeleton) proportions, e.g., lengths of limbs, etc. Normalization may enable the use of frames from differently scaled versions of the reference rig so that the orientations from each frame can be mapped to the same reference rig. Block 530 may be followed by block 540.

At block 540, a machine learning model is trained based on the swing decomposition component, the twist decomposition component, and the respective pose that are provided as input to the machine learning model. In some implementations, one or more parameters of the machine learning model are updated based on a distribution of rotation constraints of the reference rig in the plurality of poses, and after the training, the machine learning model is capable of determining an output pose for an input rig based on an input pose and a position of one or more target end effector located on the input rig, In some implementations, a distribution of rotation constraints of the reference rig is determined (learned) based on the respective swing decomposition component and the twist decomposition component of each frame of the plurality of frames.

In some implementations, the distribution of rotation constraints of the reference rig is determined based on a set of local orientations for each joint extracted from a provided set of animations or frames. The set of local orientations for each joint may be aggregated across a dataset and a normal distribution that most closely matches the orientation data is determined. In some implementations, the final learned distribution may be specified as a 2D gaussian distribution over the sphere to encode the swing portion and a normal 1D distribution for the twist portion.

In some implementations, learning the distribution of rotation constraints of the reference rig may include fitting a two-dimensional (2D) Gaussian distribution over a sphere to encode the swing decomposition component of each frame and fitting a one-dimensional (1D) Gaussian distribution to encode the twist decomposition component of each frame.

For each joint of the plurality of joints in the reference rig, and based on the plurality of frames provided to the machine learning model, the following quantities are determined:

A quaternion value ($q\_s$) that represents the orientation of the mean ($mu\_s$) of the swing component over a unit sphere and the principal directions of variance.

Floating values ($sigma\_s$) that indicate the standard deviation of the swing component in each of the principal directions defined by $q\_s$ A floating value ($mu\_t$) that indicates the mean of the twist component in $q\_s$ space A floating value ($sigma\_t$) that indicates the standard deviation of the twist component Block 540 may be optionally followed by block 550. At block 550, a polynomial regression may be applied to determine a relationship between an input pose, target end effector, and rotation constraints of one or more joints.

In some implementations, the polynomial regression may be applied to determine a suitable polynomial that minimizes the reconstruction error of an original function that is utilized to represent the rotation constraints in a particular dimension. The polynomial function can be simpler (e.g., lower degree) than an original representative function, and that may be utilized to represent the rotation constraints. This may enable efficient and cheap sampling at runtime of the more complex function with minimal error, enabling performance of the method in real time. This can provide technical advantages of needing fewer computational resources, real-time capability, better user experience, etc.

In some implementations, learning the distribution of rotation constraints of the reference rig may further include training a polynomial regression model based on the two-dimensional (2D) Gaussian distribution of the swing decomposition component and the one-dimensional (1D) Gaussian distribution of the twist decomposition component.

Utilizing a trained polynomial model may provide technical advantages of fast sampling, and faster run times in determination of output poses.

In some implementations, learning the polynomial regression model may include training the two-dimensional (2D) Gaussian distribution of the swing decomposition component and the one-dimensional (1D) Gaussian distribution of the twist decomposition component based on a polynomial of a particular degree, e.g., cubic polynomial.

In some implementations, the learned distribution and/or the trained model, e.g., a polynomial regression model, may be utilized to determine a pose of a virtual character that is based on a rig that is similar in structure to the reference rig.

In some implementations, determining the pose may include receiving an indication of a position of a target end effector located on a target rig, determining an output pose for the target rig wherein the determining comprises calculating a respective orientation and position of one or more joints of the plurality of joints of the target rig based on the position of the target end effector on the target rig and the learned distribution of rotation constraints of the reference rig.

In some implementations, the distribution of rotation constraints of the reference rig may include a conditional distribution of rotation constraints for each joint, conditional on other joints. For example, the rotation constraints of each joint of the plurality of joints conditional on orientations of one or other joints in the rig may be determined based on a plurality of previous joints, e.g., joints for which a position and/or orientation have been previously determined.

In some implementations, a distribution of rotation constraints for a joint may be expressed as a single product of conditional probability distributions over multiple joints, where each conditional probability distribution is conditioned over the results of previously determined joints. In some implementations, the set of constraints may be selected arbitrarily for this distribution, e.g., if a rig has 15 joints, the conditional distribution may be determined over a subset of joints, up to the entirety of the rig, which would be a single joint distribution over 15 joints or may be determined as 15 conditional distributions.

In some implementations, displaying a virtual character may include receiving an indication of a position of a target end effector located on a target rig, determining an output pose for the target rig wherein the determining comprises calculating a respective position of one or more joints of the plurality of joints of the target rig based on the position of the target end effector on the target rig and the learned distribution of rotation constraints of the reference rig, and displaying the target rig in an output pose on a display device.

In some implementations, a predetermined number of frames (poses) may be specified as a minimum number of frames in a training set to be analyzed. The frames may be sequences of images, e.g., a set of animated frames that include a virtual character based on the reference rig, mocap frames, sets of images that include poses of a virtual character based on the reference rig, etc. In some implementations, a greater number of frames in the training set can lead to more realistic results in determining output poses using an IK solver.

In some implementations, the distribution can be learned over a large set of animations to provide a general solution. In some implementations, the distribution can be learned over a subset of frames of a specific style in order to drive the solver to preserve the style(s) included in the subset of frames.

Blocks 510-550 can be performed (or repeated) in a different order than described above and/or one or more steps can be omitted. For example, multiple reference rigs may be trained per performance of the method 500. In some implementations, block 550 may be optionally performed to determine and fit a polynomial function to the learned distribution. In some implementations, block 550 may be performed separately from method 500, or not performed at all.

Figure 6:
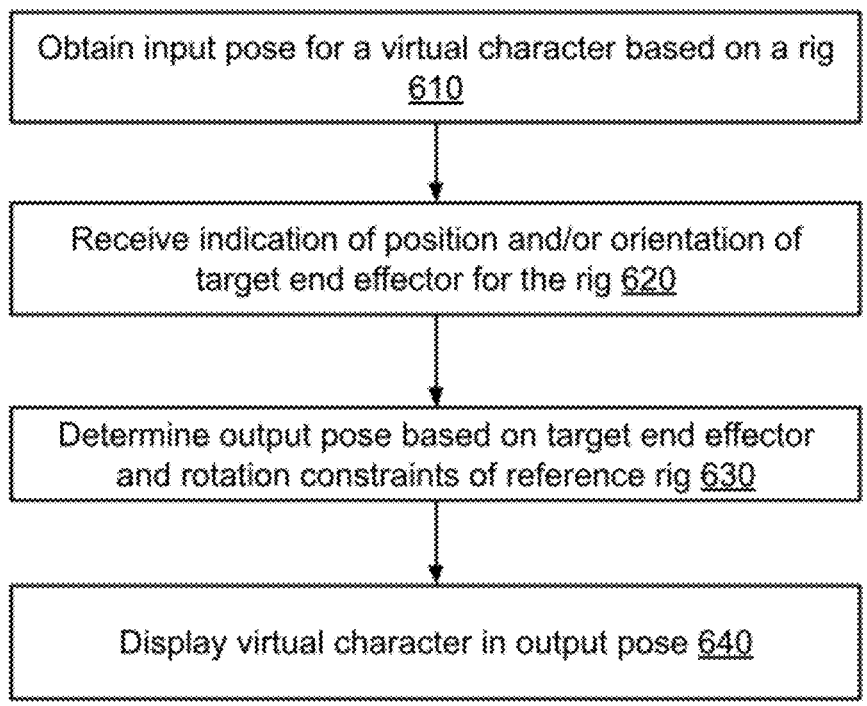
FIG. 6 is a flowchart that illustrates an example method to generate a pose for a virtual character, in accordance with some implementations.

FIG. 6 is a flowchart that illustrates an example method to generate a pose for a virtual character, in accordance with some implementations.

In some implementations, method 600 can be implemented to generate a pose for a virtual character for use in a virtual experience, for example, on virtual experience server 102 described with reference to FIG. 1, and to display a rig within a virtual environment on a display device. In some other implementations, method 600 can be implemented, for example, on one or more devices described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 600. In some examples, a first device is described as performing blocks of method 600. Some implementations can have one or more blocks of method 600 performed by one or more other devices (e.g., other client devices or server devices) that can send results or data to the first device.

Method 600 may begin at block 610. At block 610, an input pose of a virtual character which is based on a rig that includes a plurality of joints is obtained. Block 610 may be followed by block 620.

At block 620, an indication of a target position and/or orientation of a target end effector located on the rig is received. In some implementations, receiving the indication of the target position and/or orientation of the target end effector can include receiving, from a user device, a signal associated with a user dragging a point on the rig from an initial position and/or orientation of the target end effector to a target position and/or orientation of the target end effector. In some implementations, the signal may be based on movement of a pointer that is associated with position and/or orientation on a rig of the virtual character, e.g., movement of a mouse or movement of a finger on a touchscreen input device, etc.

In some implementations, the rig is associated with a virtual character (avatar) in the virtual environment, and receiving the indication of position and/or orientation of the target end effector may include receiving, from a user device, a target position and/or orientation for an arm of the virtual character or a leg of the virtual character.

In some implementations, the target end effector may be a joint on the rig, e.g., elbow joint, wrist joint, that is at a particular position and/or orientation in an input pose and is selected by a user and moved to a target position and/or orientation. In some implementations, the target end effector may be any point on the virtual character. Suitable adjustments may be made to determine an equivalent target position and/or orientation for a joint. Block 620 may be followed by block 630.

At block 630, an output pose for the virtual character is determined. In some implementations, determining the output pose for the virtual character may include calculating a respective orientation and position of one or more joints of the plurality of joints of the rig. In some implementations, calculating a respective orientation and position of one or more joints may also include determining a placement of one or more bones and/or other elements in a kinematic chain. For example, alignment and placement of limbs, e.g., upper arm and lower arm, may be determined based on the position and orientation of an elbow joint that connects the upper arm and lower arm.

In some implementations, the respective orientation and position of one or more joints of the rig may be determined based on the position and/or orientation of the target end effector and rotation constraints of a plurality of joints of a reference rig.

In some implementations, the reference rig may be selected such that it has the same number of joints as the rig associated with the virtual character. In some implementations, the reference rig may be selected from a set of reference rigs that is closest in structure, e.g., number of joints, layout of joints, etc., to the rig associated with the virtual character.

In some implementations, calculating the respective orientation and position of one or more joints for the plurality of joints of the rig may include obtaining (reference) rotation constraints for a corresponding reference joint of a reference rig.

In some implementations, the rotation constraints of the plurality of joints of the reference rig may be obtained from a trained machine learning model.

In some implementations, method 600 may further include training the machine learning model. The training of the machine learning model may include obtaining a plurality of frames of three-dimensional (3D) objects associated with the reference rig, analyzing each frame of the plurality of frames to determine an orientation of each reference joint of the plurality of reference joints, decomposing, based on the analysis, orientation of each reference joint of the reference rig into a swing decomposition component and a twist decomposition component, and learning a distribution of the rotation constraints of the reference rig based on the respective swing decomposition component and the twist decomposition component of each frame of the plurality of frames.

Based on the obtained reference rotation constraints for a corresponding reference joint, an inverse kinematics (IK) solver may be applied to determine the orientation and position of each joint of a plurality of joints in an output pose. The IK solver is applied to the rig and utilizes the input pose which includes an initial position and/or orientation of each of the joints of the rig. It additionally utilizes the position and/or orientation of the target end-effector to determine the output pose and an output orientation and position for each of the joints in the rig.

The inverse kinematics (IK) problem is the problem of finding a vector of joint variables which produce a desired end effector location (position) and/or orientation. In some implementations, the IK solver determines the output pose based on a determination of a set of output positions and orientations for each of the joints such that the constraints of the rig are satisfied. The constraints may include a length of each bone and any additional joint constraints that are provided, including joint rotation constraints which may be based on rotation constraints of the corresponding joint of the reference rig.

As described earlier, the IK solver problem is ill-posed, with potentially multiple non-unique solutions. For example, with reference to the examples in FIGS. 4C and 4D, poses 460 and 480 may both represent viable solutions determined by the IK solver based on the rig, the input pose, and position and/or orientation of the end effector.

Utilizing rotations constraints from the model provides additional constraints, thereby limiting an available solution space for the problem. Additionally, the solution space includes realistic poses, and may exclude non-realistic poses, thereby leading to more realistic output poses for the virtual character.

In some implementations, determining the orientation and position of one or more joints of the plurality of joints of the rig may include applying a normalization operation to the rotation constraints based on a relative size, proportion, and initial orientation of the rig and the reference rig. For example, a rig may be associated with a first skeleton and the reference rig may be associated with a second skeleton, and determining the position and/or orientation of one or more joints of the plurality of joints of the rig comprises applying a normalization operation to the rotation constraints based on a relative size, proportion, or orientation of the first skeleton to the second skeleton.

In some implementations, the normalization is based on skeleton proportions, limb lengths, and/or a rest pose. The normalization is performed so that all rotation constraints can be mapped to the same unit sphere.

In order to adapt to skeletons of different sizes, proportions and orientations, sizes/proportions of input skeletons are normalized to a unit size, and a mapping is created between orientations of the input skeleton and the reference skeleton such that a single known additional rotation maps orientations of the reference skeleton to the input skeleton.

In some implementations, the training of the machine learning model may be performed in a normalized space. Subsequently, during utilization of the machine learning model, the calculations, e.g., of rotation constraints, may still be performed in this normalized space to enable application of the trained (learned) model to a variety of skeletons, e.g., virtual characters of various sizes, proportions, orientations, etc. After the output pose, e.g., positions and/or orientations of each joint in the skeleton, a de-normalization may be performed using an inverse function to be able to be applied to the specific character currently in use.

In some implementations, obtaining the rotation constraints for the corresponding joint may include obtaining a swing rotation and a twist rotation of the corresponding joint. In some implementations, the rotation constraints may be obtained from a previously trained machine learning model of the rotation constraints of a reference rig.

In some implementations, the trained machine learning model is accessed via a call to a subroutine or function that is external to the IK solver, e.g., via a functional call, application program interface (API), etc. In some implementations, the trained machine learning model may be included within the IK solver itself.

In some implementations, obtaining the rotation constraints for the corresponding joint may include determining rotation constraints for the corresponding joint based on sampling a polynomial function that is obtained via a regression of a learned model of rotation constraints. Obtaining rotation constraints by utilizing a polynomial function can provide technical advantages since it can enable sampling with a low response time, enable efficient computation, and may speed up the time of determination of an output pose, and may provide superior results in real-time. In some implementations, the polynomial function may be a cubic polynomial function.

In some implementations, method 600 may be configured as an AutoPole feature that includes joints of the limbs (e.g., arms and legs) and can be utilized to determine a final position and/or orientation of portions of the body that are associated with the joints of the limbs, e.g., shoulder, elbow, wrist, hip, knee, and ankle. In an AutoPole feature implementation, rotation constraints of a subset of the joints of the rig are provided to the IK solver. The IK solver may utilize the rotation constraints obtained from the machine learning (learned) model for the subset of joints, and may apply a standard set of constraints for the remainder of the joints.

In some implementations, method 600 may be configured as an AutoPose feature that includes all joints of the rig (skeleton). Block 630 may be followed by block 640.

At block 640, the virtual character based on the rig is displayed in the output pose, e.g., on the display device.

In some implementations, a sequence of frames may be generated that provides a transition between an input pose and the output pose, and may be displayed as an animation that proceeds through the sequence of frames.

In some implementations, feedback obtained after a display of a first determined output pose may be utilized to perform method 600 in order to generate a different output pose. User preferences regarding the output pose accepted by the user may be stored and may be utilized to provide rotation constraints.

For example, a user may select and drag a target end-effector to a particular position and/or orientation and a corresponding first output pose may be determined and displayed. The user may choose to modify the position and/or orientation of the target end effector, based on which a second output pose may be determined and displayed, which may be accepted by the user.

In some implementations, even without a change in a position and/or orientation of a target end effector, a user may be provided with an option to request a different output pose. Since the inverse kinematics problem is an overdetermined problem, applying the IK solver can lead to a different solution of an output pose.

In some implementations, an indication may be provided to a user, e.g., via a user interface, that one or more limits or rotation constraints of a joint are being violated based on a particular target position and/or orientation of an end-effector provided by the user if it is determined that a solution for the joints is not realizable (e.g., not physically possible based on the rig dimensions) while satisfying the constraints.

In some implementations, conditional rotation constraints for joints, e.g., constraints that are based on orientations of other joints of the plurality of joints are determined and provided to the IK solver. In some implementations, an iterative process may be performed to determine the orientation of joints in a sequential process by processing along multiple links in a kinematic chain.

In some implementations, the rotation constraints of the plurality of joints of a reference rig are obtained from a machine learning model that is previously trained based on a training data set of a plurality of frames that include virtual characters. In some implementations, training the machine learning model may include obtaining a plurality of frames of three-dimensional (3D) objects associated with a reference rig, wherein the reference rig comprises a plurality of reference joints, analyzing each frame of the plurality of frames to determine an orientation of each reference joint of the plurality of reference joints, decomposing, based on the analysis, orientation of each reference joint of the reference rig into a swing decomposition component and a twist decomposition component, and learning a distribution of rotation constraints of the reference rig based on the respective swing decomposition component and the twist decomposition component of each frame of the plurality of frames.

Blocks 610-640 can be performed (or repeated) in a different order than described above and/or one or more steps can be omitted.

Figure 7:
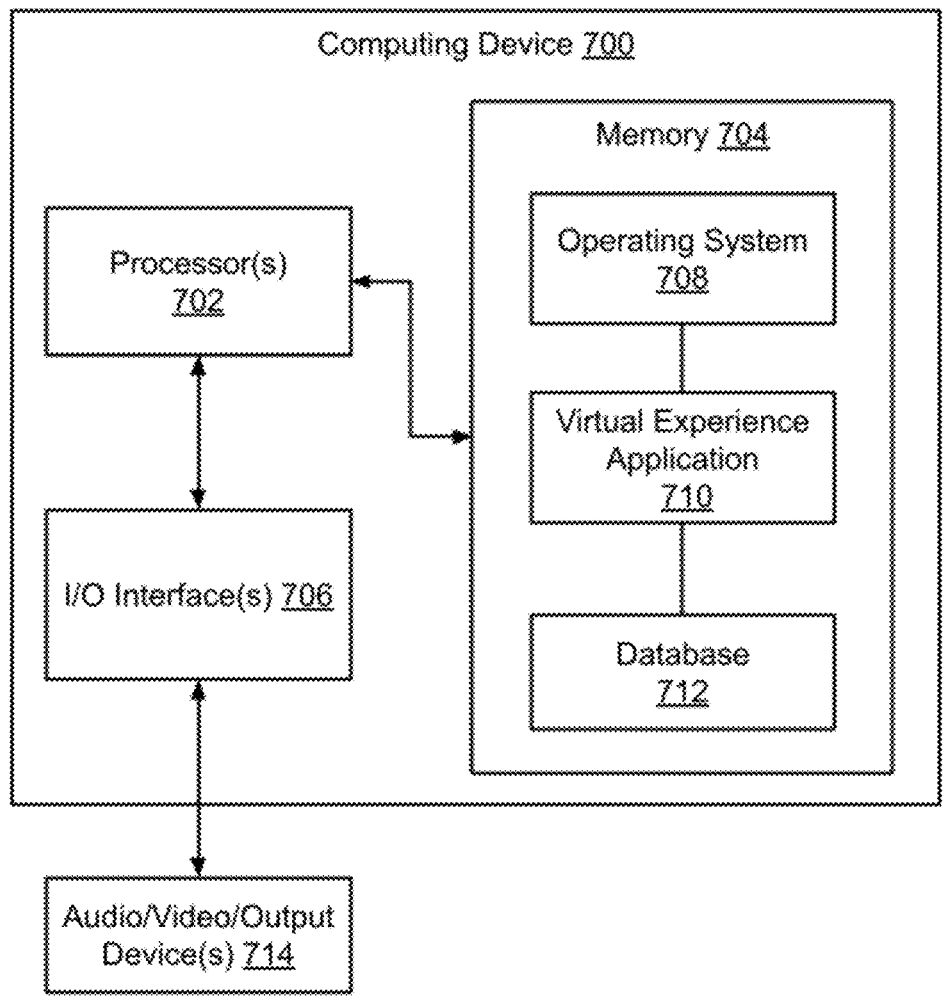
FIG. 7 is a block diagram that illustrates an example computing device, in accordance with some implementations.

FIG. 7 is a block diagram of an example computing device 700 which may be used to implement one or more features described herein. In one example, device 700 may be used to implement a computer device (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, virtual experience device, wearable device, etc.). In some implementations, device 700 includes a processor 702, a memory 704, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., a virtual experience application, and application database 712. In some implementations, application 710 can include instructions that enable processor 702 to perform the functions (or control the functions of) described herein, e.g., some or all of the methods described with respect to FIGS. 5 and 6.

Elements of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 120), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks of operating system 708 and virtual experience application 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the virtual experience server 102 is described as performing operations as described in some implementations herein, any suitable component or combination of components of virtual experience server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 500 and/or 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to display a virtual character within a virtual environment, the computer-implemented method comprising:
    obtaining an input pose of the virtual character, wherein the virtual character is based on an input rig that comprises a plurality of joints;
    receiving an indication of one or more of a position and an orientation of a target for an end effector located on the input rig;
    obtaining a learned distribution of joint angles of a plurality of joints of a reference rig;
    determining, based on the input pose of the virtual character and the learned distribution of joint angles of the plurality of joints of the reference rig, rotation constraints of the plurality of joints of the reference rig;
    determining an output pose for the virtual character wherein the determining the output pose comprises calculating a respective orientation and a respective position of one or more joints of the plurality of joints of the input rig based on the position of the target for the end effector and the rotation constraints of the plurality of joints of the reference rig; and
    displaying the virtual character in the output pose in the virtual environment.

2. The computer-implemented method of claim 1, wherein calculating the respective orientation and the respective position of the one or more joints for the plurality of joints of the input rig comprises, for each joint of the one or more joints:
    obtaining the rotation constraints for a corresponding joint of the reference rig; and
    determining, using an inverse kinematics (IK) solver, an orientation and a position of each joint based on the rotation constraints for the corresponding joint of the reference rig and the position of the target for the end effector.

3. The computer-implemented method of claim 2, wherein obtaining the rotation constraints for the corresponding joint comprises obtaining a swing rotation and a twist rotation of the corresponding joint.

4. The computer-implemented method of claim 2, wherein obtaining the rotation constraints for the corresponding joint comprises determining the rotation constraints for the corresponding joint based on sampling a cubic polynomial.

5. The computer-implemented method of claim 1, wherein the input rig is associated with a first skeleton and the reference rig is associated with a second skeleton, and wherein determining the respective orientation and the respective position of the one or more joints of the plurality of joints of the input rig comprises applying a normalization operation to the rotation constraints based on one or more of a relative size, proportion, and orientation of the first skeleton to the second skeleton.

6. The computer-implemented method of claim 1, wherein receiving the indication of the position of the target for the end effector comprises receiving, from a user device, a signal associated with a user dragging a point on the input rig from an initial position of the target for the end effector to a target position of the target for the end effector.

7. The computer-implemented method of claim 1, wherein receiving the indication of the position of the target for the end effector comprises receiving, from a user device, a target position for one of: an arm of the virtual character and a leg of the virtual character.

8. The computer-implemented method of claim 1, wherein receiving the position of the target for the end effector comprises receiving, from a user device, a target position for a particular joint of the plurality of joints of the input rig.

9. The computer-implemented method of claim 1, wherein obtaining the learned distribution of joint angles of the plurality of joints of the reference rig comprises obtaining the learned distribution of joint angles of the plurality of joints of the reference rig from a trained machine learning model.

10. A computer-implemented method to train a machine learning model to determine an output pose for a rig, the computer-implemented method comprising:
obtaining a plurality of frames that depict a virtual character in a plurality of poses, the virtual character based on a reference rig that comprises a plurality of joints;
analyzing the plurality of frames to determine an orientation of each joint of the plurality of joints of the reference rig in a respective pose of the plurality of poses;
resolving a respective orientation of each joint of the reference rig into a swing decomposition component and a twist decomposition component; and
training the machine learning model based on the swing decomposition component, the twist decomposition component, and the respective pose as input to the machine learning model, wherein one or more parameters of the machine learning model are updated based on a distribution of rotation constraints of the reference rig in the plurality of poses, and wherein, after the training, the machine learning model is capable of determining an output pose for an input rig based on an input pose and one or more of a position and an orientation of a target end effector located on the input rig.

11. The computer-implemented method of claim 10, wherein training the machine learning model comprises learning the distribution of rotation constraints of the reference rig by fitting a two-dimensional (2D) Gaussian distribution over a sphere to encode the swing decomposition component of each frame and fitting a one-dimensional (1D) Gaussian distribution to encode the twist decomposition component of each frame.

12. The computer-implemented method of claim 11, wherein the machine learning model is a polynomial regression model based on the two-dimensional (2D) Gaussian distribution of the swing decomposition component and the one-dimensional (1D) Gaussian distribution of the twist decomposition component.

13. The computer-implemented method of claim 11, wherein training the machine learning model comprises learning the two-dimensional (2D) Gaussian distribution of the swing decomposition component and the one-dimensional (1D) Gaussian distribution of the twist decomposition component based on a cubic polynomial.

14. A non-transitory computer-readable medium with instructions stored thereon that, responsive to execution by a processing device, cause the processing device to perform operations comprising:
obtaining an input pose of a virtual character, wherein the virtual character is based on an input rig that comprises a plurality of joints;
receiving an indication of one or more of a position and an orientation of a target end effector located on the input rig;
obtaining a learned distribution of joint angles of a plurality of joints of a reference rig;
determining, based on the input pose of the virtual character and the learned distribution of joint angles of the plurality of joints of the reference rig, rotation constraints of the plurality of joints of the reference rig;
determining an output pose for the virtual character wherein the determining the output pose comprises calculating a respective orientation and a respective position of one or more joints of the plurality of joints of the input rig based on the position of the target end effector and the rotation constraints of the plurality of joints of the reference rig; and
displaying the virtual character in the output pose in a virtual environment.

15. The non-transitory computer-readable medium of claim 14, wherein calculating the respective orientation and the respective position of the one or more joints for the plurality of joints of the input rig comprises, for each joint of the one or more joints:
obtaining, the rotation constraints for a corresponding joint of the reference rig; and
determining, using an inverse kinematics (IK) solver, an orientation and a position of each joint, based on the rotation constraints for the corresponding joint of the reference rig and the position of the target end effector.

16. The non-transitory computer-readable medium of claim 15, wherein obtaining the rotation constraints for the corresponding joint comprises obtaining a swing rotation and a twist rotation of the corresponding joint.

17. The non-transitory computer-readable medium of claim 14, wherein receiving the indication of the position of the target end effector comprises receiving, from a user device, a target position for one of: an arm of the virtual character and a leg of the virtual character.

18. A system comprising:
a memory with instructions stored thereon; and
a processing device, coupled to the memory, the processing device configured to access the memory and execute the instructions, wherein the instructions cause the processing device to perform operations including:

obtaining an input pose of a virtual character, wherein the virtual character is based on an input rig that comprises a plurality of joints;

receiving an indication of one or more of a position and an orientation of a target end effector located on the input rig;

obtaining a learned distribution of joint angles of a plurality of joints of a reference rig;

determining, based on the input pose of the virtual character and the learned distribution of joint angles of the plurality of joints of the reference rig, rotation constraints of the plurality of joints of the reference rig;

determining an output pose for the virtual character wherein the determining the output pose comprises calculating a respective orientation and a respective position of one or more joints of the plurality of joints of the input rig based on the position of the target end effector and the rotation constraints of the plurality of joints of the reference rig; and displaying the virtual character in the output pose in a virtual environment.

19. The system of claim 18, wherein calculating the respective orientation and the respective position of one or more joints for the plurality of joints of the input rig comprises, for each joint of the one or more joints:

obtaining, the rotation constraints for a corresponding joint of the reference rig; and determining, using an inverse kinematics (IK) solver, an orientation and a position of each joint, based on the rotation constraints for the corresponding joint of the reference rig and the position of the target end effector.

20. The system of claim 18, wherein the input rig is associated with a first skeleton and the reference rig is associated with a second skeleton, and wherein determining the respective orientation and the respective position of the one or more joints of the plurality of joints of the input rig comprises applying a normalization operation to the rotation constraints based on one or more of a relative size, proportion, and orientation of the first skeleton to the second skeleton.

* * * * *